United States Patent
McCaffrey

(10) Patent No.: US 9,121,296 B2
(45) Date of Patent: Sep. 1, 2015

(54) ROTATABLE COMPONENT WITH CONTROLLED LOAD INTERFACE

(75) Inventor: Michael G. McCaffrey, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 915 days.

(21) Appl. No.: 13/289,161

(22) Filed: Nov. 4, 2011

(65) Prior Publication Data

US 2013/0115089 A1     May 9, 2013

(51) Int. Cl.

| | |
|---|---|
| *F01D 5/30* | (2006.01) |
| *B23K 20/02* | (2006.01) |
| *B23K 20/12* | (2006.01) |
| *B23P 6/00* | (2006.01) |
| *B23K 20/00* | (2006.01) |
| *B23K 1/008* | (2006.01) |

(52) U.S. Cl.
CPC ............... *F01D 5/3061* (2013.01); *B23K 1/008* (2013.01); *B23K 20/002* (2013.01); *B23K 20/028* (2013.01); *B23K 20/12* (2013.01); *B23K 2201/001* (2013.01); *B23K 2203/18* (2013.01); *B23P 6/002* (2013.01); *F05D 2200/33* (2013.01); *Y02T 50/671* (2013.01); *Y10T 29/49318* (2015.01); *Y10T 29/49968* (2015.01); *Y10T 156/10* (2015.01); *Y10T 428/24942* (2015.01)

(58) Field of Classification Search
CPC . F01D 5/3061; F05D 2200/33; Y10T 156/10; Y10T 428/24942; Y10T 428/2495; Y10T 428/24967; Y10T 29/49318; Y10T 29/49968; B23P 6/002; B23K 1/00; B23K 1/0008; B23K 20/12; B23K 20/02; B23K 20/002; B23K 20/028; B23K 2201/001; B23K 2203/08; B23K 2203/18
USPC .......... 416/213 R, 213 A, 204 R, 204 A, 234, 416/244 A, 241 R; 228/170, 172
See application file for complete search history.

(56) References Cited

U.S. PATENT DOCUMENTS

| | | | |
|---|---|---|---|
| 6,183,202 B1 | 2/2001 | Ganshaw | |
| 7,153,102 B2 | 12/2006 | Stone | |
| 2003/0223873 A1* | 12/2003 | Carrier | 416/213 R |
| 2005/0084381 A1* | 4/2005 | Groh et al. | 416/244 A |
| 2008/0107531 A1* | 5/2008 | Chou et al. | 416/213 R |
| 2009/0304514 A1* | 12/2009 | Izadi et al. | 416/213 R |
| 2009/0314823 A1* | 12/2009 | Bray | 228/112.1 |

FOREIGN PATENT DOCUMENTS

GB     1064399 A  *  4/1967  ............... 416/213 A

* cited by examiner

*Primary Examiner* — Christopher Verdier
(74) *Attorney, Agent, or Firm* — Carlson, Gaskey & Olds, P.C.

(57) ABSTRACT

A rotatable component includes a first section and a second section that is located radially outwards of the first section with regard to an axis of rotation about which the sections are co-rotatable. These sections are attached together at a bonded interface. At a perimeter region of the bonded interface a perimeter portion of the first section has a first stiffness and a perimeter portion of the second section has a second stiffness that is greater than the first stiffness.

18 Claims, 3 Drawing Sheets

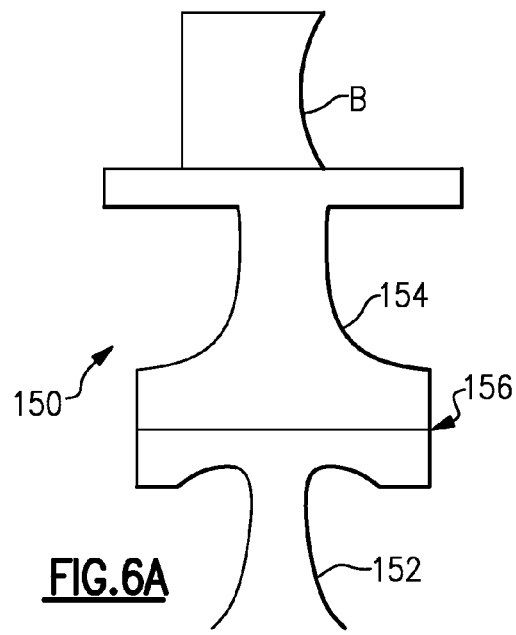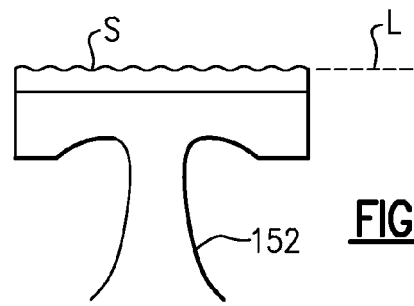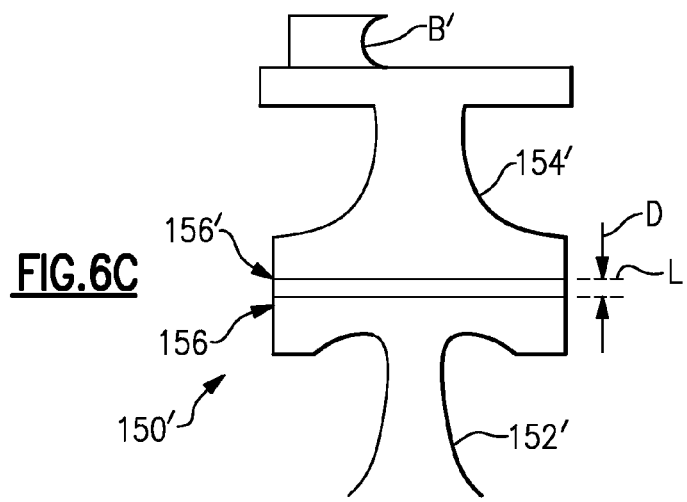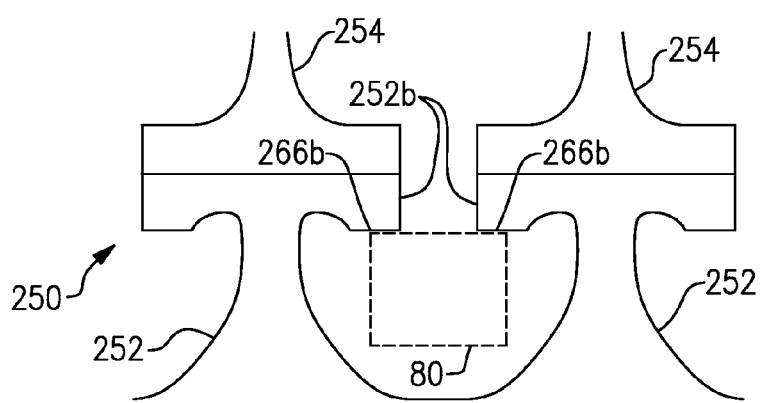

ROTATABLE COMPONENT WITH CONTROLLED LOAD INTERFACE

BACKGROUND

Rotatable components are known and used in machinery, such as gas turbine engines. For example, a typical gas turbine engine includes blades that are mounted for rotation on a disk. The blades include a keyed root that mechanically interlocks with a corresponding receiver on the disk. Such a configuration permits the blades to be relatively easily slid into or out of the disk for installation or maintenance.

SUMMARY

Disclosed is a rotatable component that includes a first section and a second section that is located radially outwards of the first section with regard to an axis of rotation about which the sections are co-rotatable. The sections are attached together at a bonded interface. At a perimeter region of the bonded interface, a perimeter portion of the first section has a first stiffness and a perimeter portion of the second section has a second stiffness that is greater than the first stiffness.

In one aspect, the rotatable component is within a turbine engine that includes a compressor section, a combustor that is in fluid communication with the compressor section, and a turbine section that is in fluid communication the combustor. At least one of the compressor section and the turbine section includes the rotatable component.

Also disclosed is a method for controlling a load between bonded sections of a rotatable component. The method includes bonding a first section and a second section together at a bonded interface such that the second section is located radially outwards of the first section with regard to an axis of rotation about which the first section and the second section are co-rotatable. Each of the first section and the second section has respective perimeter portions at a perimeter region of the bonded interface. The perimeter portion of the first section has a first stiffness and the perimeter portion of the second section has a second stiffness that is greater than the first stiffness. Upon co-rotation of the first section and the second section, there is a greater centrifugal pull on the perimeter portion of the first section than on the perimeter portion of the second section to reduce a tensile load on the bonded interface in the perimeter region.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 6A shows another example rotatable component.
FIG. 6B shows a rotatable component with a section removed.
FIG. 6C shows a rotatable component with a new section in place of a removed section.
FIG. 7 shows a rotatable component with a damper element.

DETAILED DESCRIPTION OF THE PREFERRED EMBODIMENT

Figure 1:
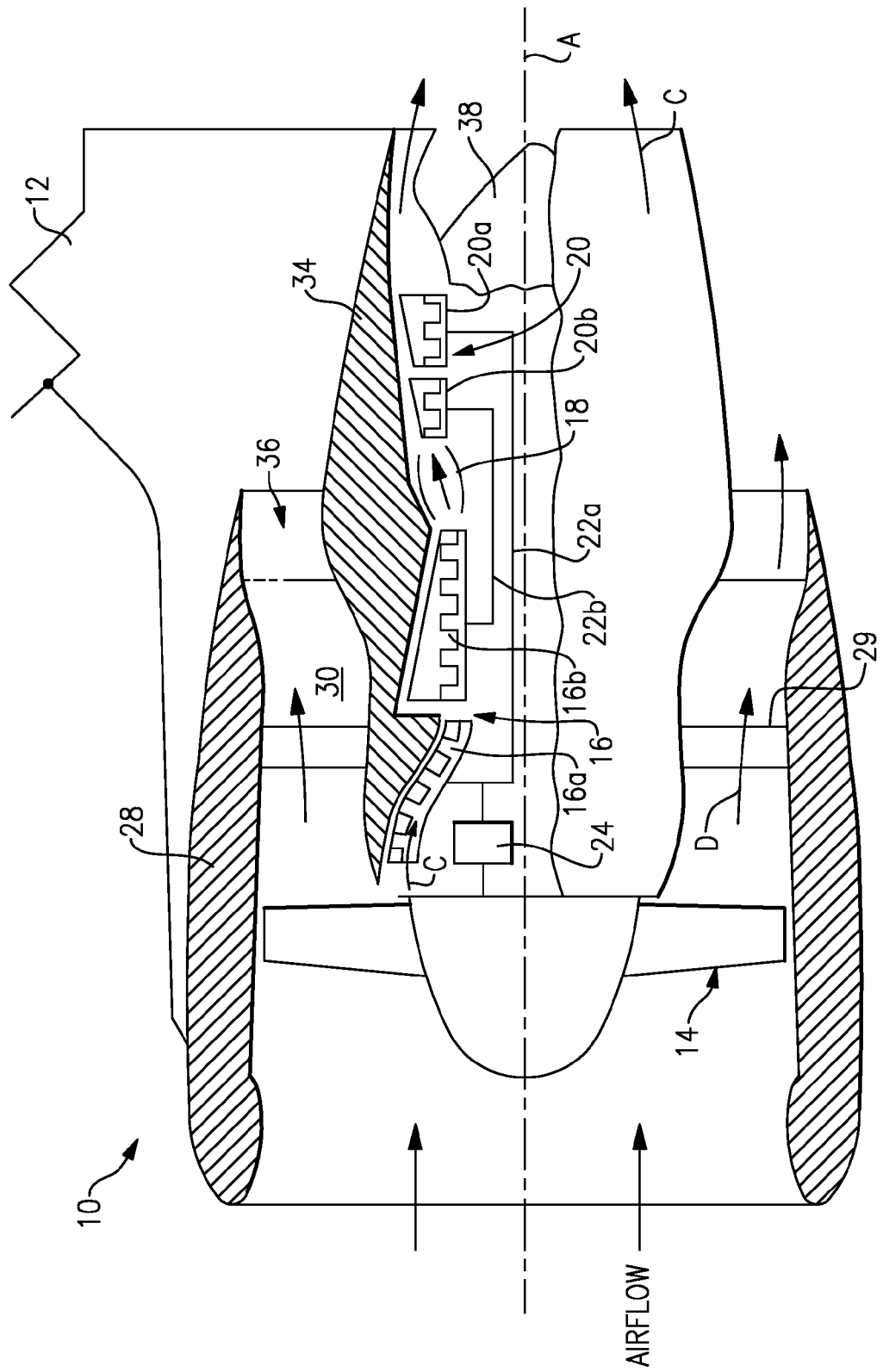
FIG. 1 shows an example turbine engine.
Figure 2:
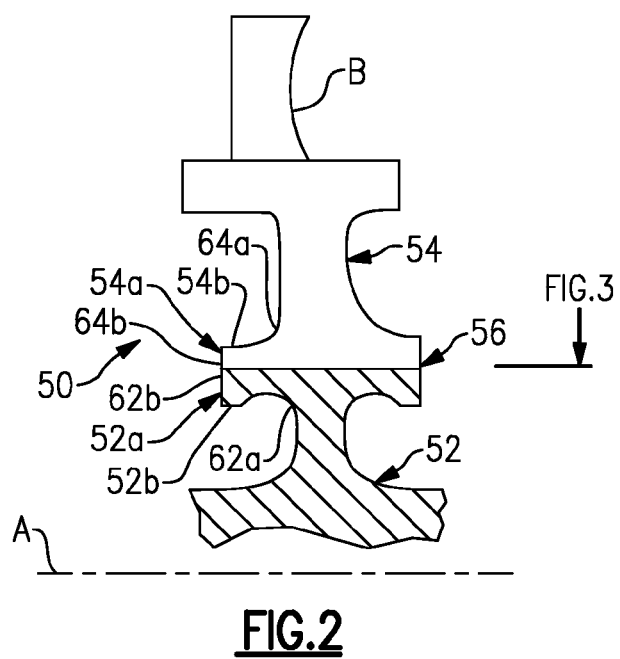
FIG. 2 shows an example rotatable component.

FIG. 1 illustrates a schematic view of selected portions of an example turbine engine 10, which serves as an exemplary operating environment for a rotatable component 50 (FIG. 2). It will be appreciated that the rotatable component is not limited to use in turbine engines and that other machinery will also benefit from this disclosure. As will be described in further detail, the rotatable component 50 includes features for controlling load transfer therethrough, which allows the load path to be shifted away from perimeter areas that are sensitive to stress-concentrators. The control over load transfer thereby enables the use of bonded interfaces in rotatable components over mechanical interlock designs.

In the illustrated example, the turbine engine 10 is suspended from an engine pylon 12 of an aircraft, as is typical of an aircraft designed for subsonic operation. The turbine engine 10 is circumferentially disposed about an engine centerline, or axial centerline axis A. The turbine engine 10 includes a fan 14, a compressor 16 having a low pressure compressor section 16a and a high pressure compressor section 16b, a combustion section 18, and a turbine 20 having a high pressure turbine section 20b and a low pressure turbine section 20a.

As is known, air compressed in the compressors 16a, 16b is mixed with fuel that is burned in the combustion section 18 and expanded in the turbines 20a and 20b. The turbines 20a and 20b are coupled to drive, respectively, rotors 22a and 22b (e.g., spools) to rotationally drive the compressors 16a, 16b and the fan 14 in response to the expansion. In this example, the rotor 22a drives the fan 14 through a gear train 24.

In the example shown, the turbine engine 10 is a high bypass, geared turbofan arrangement, although the examples herein can also be applied in other engine configurations. In a further example, the bypass ratio is greater than 10:1, the fan 14 diameter is substantially larger than the diameter of the low pressure compressor 16a and the low pressure turbine 20a has a pressure ratio that is greater than 5:1. The gear train 24 can be any known suitable gear system, such as a planetary gear system with orbiting planet gears, planetary system with non-orbiting planet gears, or other type of gear system. In the disclosed example, the gear train 24 has a constant gear ratio. It is to be appreciated that the illustrated engine configuration and parameters are only exemplary and that the examples disclosed herein are applicable to other turbine engine configurations, including ground-based turbines that do not have fans.

An outer housing, nacelle 28, (also commonly referred to as a fan nacelle) extends circumferentially about the fan 14. A generally annular fan bypass passage 30 extends between the nacelle 28 and an inner housing, inner cowl 34, which generally surrounds the compressors 16a, 16b and turbines 20a, 20b. The turbine engine 10 also includes guide vanes 29 (shown schematically).

In operation, the fan 14 draws air into the turbine engine 10 as a core flow, C, and into the bypass passage 30 as a bypass air flow, D. In one example, approximately 80 percent of the airflow entering the nacelle 28 becomes bypass airflow D. A rear exhaust 36 discharges the bypass air flow D from the turbine engine 10. The core flow C is discharged from a passage between the inner cowl 34 and a tail cone 38. A significant amount of thrust may be provided by the bypass airflow D due to the high bypass ratio.

As can be appreciated, the turbine engine 10 may include rotatable components in one or more of the sections of the engine, such as the fan 14, the low pressure compressor section 16a, the high pressure compressor section 16b, the high pressure turbine section 20b and the low pressure turbine section 20a.

FIG. 2 shows an example of the rotatable component 50. The rotatable component 50 includes a first section 52 and a second section 54 that is located radially outwards of the first section 52 with regard to the axis A about which the sections 52 and 54 co-rotate during operation. As shown in the application of the turbine engine 10, the rotatable component 50 is a bladed turbine disk. The first section 52 is a disk (shown in part) and the second section 54 includes an airfoil blade B. The bladed turbine disk includes a plurality of first sections 52 and corresponding second sections 54 circumferentially arranged about axis A. In general, the airfoil blade B has a wing-like shape that provides a lift force via Bernoulli's principle such that one side of the blade is a suction side and the other side of the airfoil is a pressure side.

Figure 3:
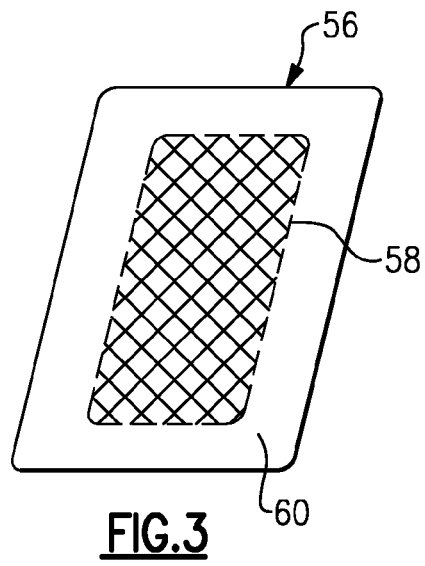
FIG. 3 shows a bonded interface of a rotatable component.

The first section 52 and the second section 54 are attached together at a bonded interface 56, which is shown in a sectional view in FIG. 3. In this example, the bonded interface 56 is substantially planar and includes an interior region 58 and a perimeter region 60 that extends around the periphery of the bonded interface 56.

The first section 52 is bonded to the second section 54 entirely across the bonded interface 56. For example, the bonded interface 56 is the product of diffusion bonding, brazing, linear friction welding, inertial bonding or other type of component-to-component bonding processes. In the illustrated example, the sections 52 and 54 are each formed of metallic materials and the selected bonding process is thus suitable for the given metallic compositions. In embodiments, the materials of the sections 52 and 54 are the same or different metallic materials. In one example, the selected materials have the same chemical composition and are nickel alloy. In other examples, one of both of the materials are non-metallic, such as polymeric.

At the perimeter region 60 of the bonded interface 56, the first section 52 includes a perimeter portion 52a and the second section 54 includes a perimeter portion 54a. The radial surfaces of the perimeter portions 52a and 54a are bonded together at the perimeter region 60 of the bonded interface 56.

The perimeter portion 52a has a first stiffness and the perimeter portion 54a has a second stiffness that is greater than the first stiffness. For example, the stiffness is a function of the respective geometries of the perimeter portions 52a and 54a and/or the materials selected. As will be described below, the difference in stiffness between the perimeter portions 52a and 54a controls load distribution across the bonded interface 56 during operation of the rotatable component 50.

In one example, the geometry of the perimeter portions 52a and 54a controls, at least on part, the difference in stiffness between the perimeter portions 52a and 54a. The perimeter portion 52a of the first section 52 includes a flange 52b that extends between a base 62a and a free end 62b. The perimeter portion 54a of the second section 54 includes another flange 54b that extends between a base 64a and a free end 64b. Although shown in two dimensions in FIG. 2, it is to be understood that the flanges 52b and 54b in this example extend completely around the respective sections 52 and 54.

Figure 4:
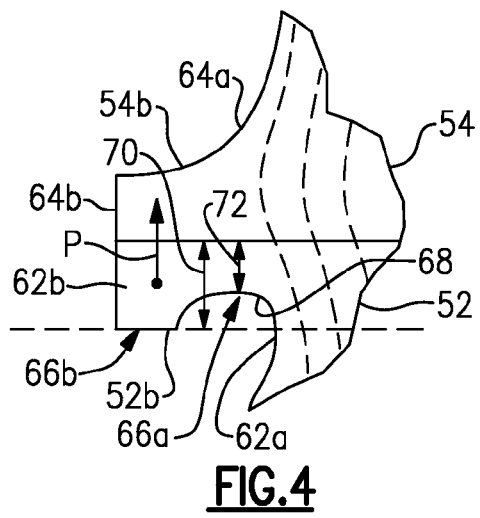
FIG. 4 shows a section view of the rotatable component of FIG. 2.

Referring to FIG. 4, the flange 52b of the first section 52 includes a proximal portion 66a and a distal portion 66b with regard to proximity to the base 62a. In this example, the distal portion 66b is radially larger than the proximal portion 66a.

As shown, the proximal portion 66a is formed with an undercut 68 to provide the distal portion 66b with a maximum radial dimension 70 ($R_{max}$) and the proximal portion 66a with a minimum radial dimension 72 ($R_{min}$). Thus, the flange 52b has a non-uniform radial thickness, which controls the stiffness. It is to be understood that the flange 52b can alternatively have a different shape than the illustrated shape with the undercut 68 to achieve the non-uniform radial thickness and desired stiffness. In one example, a ratio of $R_{min}/R_{max}$ ($R_{min}$ divided by $R_{max}$) is 0.25 to 0.75 to effectively decrease the stiffness of the flange 52b. In a further example, the ratio is greater than 0.5 in the given range or is at least 0.5.

Figure 5:
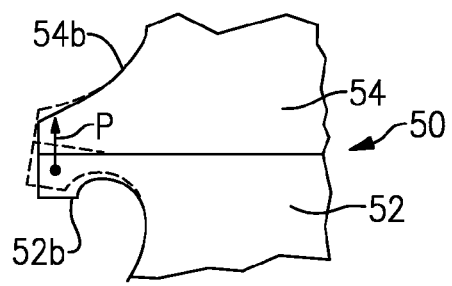
FIG. 5 shows a section view of a rotatable component during operation.

As shown the section view of FIG. 5, the difference between the stiffness of the flange 52b and the stiffness of the flange 54b causes a greater centrifugal pull P on the flange 52b than on the flange 54b during operation (i.e., rotation) of the rotatable component 50. Thus, a potential amount of deflection of the flange 52b exceeds the actual amount of deflection of the flange 54b. The result is that the flange 52b tends to deflect against the flange 54b and thereby reduces a tensile load on the bonded interface 56 in the perimeter region 60. In some examples, there is a compressive load in the perimeter region 60. The reduction in the tensile load has the effect of distributing or focusing the tensile load (due to centrifugal forces) across the bonded interface 56 to the interior region 58. The reduction in tensile load in the perimeter region 60 makes the rotatable component 50 less sensitive to the effects of any imperfections or other stress concentrators in the perimeter region 60. The reduced sensitivity to imperfections and other stress concentrators in the perimeter region 60 thereby permits the bonded interface 56 to be used in the rotational component 50 to replace mechanical interlock designs, for example.

As shown in FIGS. 6A, 6B and 6C, the methodology for controlling the load is also applicable to maintenance circumstances. FIG. 6A shows a rotatable component 150 that includes a first section 152 and a second section 154 that are attached together at bonded interface 156. In this disclosure, like reference numerals designate like elements where appropriate and reference numerals with the addition of one-hundred, multiples thereof or a prime (') designate modified elements that are understood to incorporate the same features and benefits of the corresponding elements.

The second section 154 includes an airfoil blade B that is removed because of damage during use, for example. As shown in FIG. 6B, a substantial portion of the second section 154, including the airfoil blade B, is removed by cutting or the like at surface S along a line L. As shown in FIG. 6C, the line L is spaced a distance D from the plane of the bonded interface 156. Alternatively, the surface S is cut lower such that the bonded interface 156 is removed with the second section 154.

The surface S serves as a bonding surface for attachment to a new second section 154' to provide rotatable component 150'. Thus, the first section 152 and any remaining portion of the second section 154 after removal in essence become a new first section 152' that is attached to the new second section 154' at bonded interface 156'. The new second section 154' includes a new airfoil blade B'. The new second section 154' may be sized to account for the distance D such that the airfoil blade B is properly positioned.

FIG. 7 shows another embodiment of a rotatable component 250 that includes a damper element 80 located radially inwards of the flange 252b of the first component 252 and in contact with the distal portion 266b of the flange 252b. As shown, the damper element 80 optionally is also in contact with the distal portion 266b of a neighboring flange 252b of a first section 252. The damper element 80 serves a dual purpose of controlling vibration and frequency tuning of the blades of the second sections 254 and increasing bending mass of the flanges 252b to further reduce tensile loads in the perimeter region 56.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A rotatable component comprising:
   a first section;
   a second section located radially outwards of the first section with regard to an axis of rotation about which the first section and the second section are co-rotatable;
   a bonded interface at which the first section and the second section are attached together, and at a perimeter region of the bonded interface a perimeter portion of the first section has a first stiffness and a perimeter portion of the second section has a second stiffness that is greater than the first stiffness,
   wherein the perimeter portion of the first section comprises a flange extending between a base and a free end, the perimeter portion of the second section comprises another flange extending between a base and a free end, the flange of the first section including a proximal portion and a distal portion with regard to proximity to its base, and the distal portion is radially larger than the proximal portion; and
   wherein the distal portion includes a maximum radial dimension ($R_{max}$) and the proximal portion includes a minimum radial dimension ($R_{min}$), and a ratio of $R_{min}/R_{max}$ ($R_{min}$ divided by $R_{max}$) is 0.25 to 0.75.

2. The rotatable component as recited in claim 1, wherein the ratio of $R_{min}/R_{max}$ is at least 0.5.

3. The rotatable component as recited in claim 1, including a damper element located radially inwards of the flange of the first component and in contact with the distal portion of the flange of the first component.

4. The rotatable component as recited in claim 1, wherein the radial thickness of the flange of the first section is non-uniform.

5. The rotatable component as recited in claim 1, wherein the flange of the first section includes an undercut.

6. The rotatable component as recited in claim 1, wherein the first section and the second section comprise materials having the same chemical composition.

7. The rotatable component as recited in claim 6, wherein the materials are a nickel alloy.

8. The rotatable component as recited in claim 1, wherein the bonded interface is planar.

9. The rotatable component as recited in claim 1, wherein the second section includes an airfoil blade.

10. A turbine engine comprising:
    a compressor section;
    a combustor in fluid communication with the compressor section; and
    a turbine section in fluid communication with the combustor,
    wherein at least one of the compressor section and the turbine section includes a rotatable component comprising a first section, a second section located radially outwards of the first section with regard to an axis of rotation about which the first section and the second section are co-rotatable, and a bonded interface at which the first section and the second section are attached together, and at a perimeter region of the bonded interface a perimeter portion of the first section has a first stiffness and a perimeter portion of the second section has a second stiffness that is greater than the first stiffness,
    wherein the perimeter portion of the first section comprises a flange extending between a base and a free end, the perimeter portion of the second section comprises another flange extending between a base and a free end, the flange of the first section including a proximal portion and a distal portion with regard to proximity to its base, and the distal portion is radially larger than the proximal portion, and
    wherein the distal portion includes a maximum radial dimension ($R_{max}$) and the proximal portion includes a minimum radial dimension ($R_{min}$) and a ratio of $R_{min}/R_{max}$ ($R_{min}$ divided by $R_{max}$) is 0.25 to 0.75.

11. The turbine engine as recited in claim 10, wherein the rotatable component is a bladed disk.

12. The turbine engine as recited in claim 10, wherein the second section includes an airfoil blade.

13. A method for controlling a load between bonded sections of a rotatable component, the method comprising:
    bonding a first section and a second section together at a bonded interface such that the second section is located radially outwards of the first section with regard to an axis of rotation about which the first section and the second section are co-rotatable; and
    at a perimeter region of the bonded interface, establishing a perimeter portion of the first section to have a first stiffness and a perimeter portion of the second section to have a second stiffness that is greater than the first stiffness such that, upon co-rotation of the first section and the second section, there is greater centrifugal pull on the perimeter portion of first section than on the perimeter portion of second section to reduce a tensile load on the bonded interface in the perimeter region,
    wherein the perimeter portion of the first section comprises a flange extending between a base and a free end, the perimeter portion of the second section comprises another flange extending between a base and a free end, the flange of the first section including a proximal portion and a distal portion with regard to proximity to its base, and the distal portion is radially larger than the proximal portion, and
    wherein the distal portion includes a maximum radial dimension ($R_{max}$) and the proximal portion includes a minimum radial dimension ($R_{min}$), and a ratio of $R_{min}/R_{max}$ ($R_{min}$ divided by $R_{max}$) is 0.25 to 0.75.

14. The method as recited in claim 13, including establishing the first stiffness by providing the perimeter portion of the first section with the flange including an undercut.

15. The method as recited in claim 13, including establishing the first stiffness by providing the perimeter portion of the first section with the flange having a non-uniform radial thickness.

16. The method as recited in claim 13, including establishing the first stiffness by providing the perimeter portion of the first section with the flange including a radially enlarged end portion.

17. The method as recited in claim 13, wherein the second section includes an airfoil blade and, prior to the bonding of the first section and the second section, a prior airfoil blade is removed from the first section.

18. The method as recited in claim 17, including locating the bonded interface a distance from a preexisting bonded interface between the prior airfoil blade and the first section.

\* \* \* \* \*